United States Patent [19]

Stevenson

[11] 4,358,466
[45] Nov. 9, 1982

[54] FREEZER TO MICROWAVE OVEN BAG

[75] Inventor: Fred Stevenson, Beaverton, Mich.

[73] Assignee: The Dow Chemical Company, Midland, Mich.

[21] Appl. No.: 172,922

[22] Filed: Jul. 28, 1980

Related U.S. Application Data

[63] Continuation-in-part of Ser. No. 139,363, Apr. 11, 1980, abandoned.

[51] Int. Cl.$^3$ .............................................. B65D 30/18
[52] U.S. Cl. ........................................ 426/106; 150/1; 229/61; 229/DIG. 14; 493/189; 493/243; 493/936; 426/113; 426/118; 426/410; 426/412
[58] Field of Search ............... 426/113, 118, 111, 115, 426/410, 412, 106, 127, 413, 107; 93/35 SB; 53/455, 456, 450; 229/57, 61, DIG. 14, 62, 55, 58, 53, 22; 150/1; 493/189, 243, 936

[56] References Cited

U.S. PATENT DOCUMENTS

| | | | |
|---|---|---|---|
| 1,322,984 | 11/1919 | Wesley | 150/2.3 |
| 2,401,109 | 5/1946 | Rondin | 53/455 |
| 2,718,105 | 9/1955 | Ferguson et al. | 53/450 |
| 3,052,554 | 9/1962 | Colman | 426/111 |
| 3,198,228 | 8/1965 | Naito | 229/62 |
| 3,380,646 | 4/1968 | Donen et al. | 229/57 |
| 3,438,567 | 4/1969 | Bell | 229/3.5 MF |
| 3,582,363 | 6/1971 | Jones | 426/410 |
| 3,595,468 | 7/1971 | Repko | 229/62 |
| 3,741,778 | 6/1973 | Rowe | 426/107 |
| 3,775,239 | 11/1973 | Snow | 426/127 |
| 3,799,914 | 3/1974 | Schmit et al. | 426/115 |
| 3,973,045 | 8/1976 | Branberg et al. | 406/113 |
| 3,980,225 | 9/1976 | Kan | 229/61 |
| 3,997,677 | 12/1976 | Hirsch et al. | 426/118 |
| 4,038,425 | 7/1977 | Brandberg et al. | 426/107 |
| 4,041,851 | 8/1977 | Jentsch | 93/35 SB |
| 4,216,639 | 8/1980 | Gautier | 53/455 |
| 4,252,238 | 2/1981 | Spiegelberg et al. | 229/62 |

FOREIGN PATENT DOCUMENTS 672445 10/1963 Canada .................................. 229/57

Primary Examiner—Steven L. Weinstein
Attorney, Agent, or Firm—Lloyd E. Hessenaur, Jr.

[57] ABSTRACT

A disposable or reusable and reclosable thermoplastic bag capable of being compactly stored as a food container in freezers, yet capable of standing with an upright spout in a microwave oven for non-spill thawing and cooking of food contained in the bag. The bag is formed of two wing-shaped pouches on either side of the upright spout. The preferred closure is a zipper type which can automatically vent upon softening of its thermoplastic structure during the cooking stage. The bag preferably has inner and outer skin layers of different heat-softening temperature responses so that peripheral sealing is effected only with the inner layers, allowing the wing-shaped pouches to be formed out of a gusseted bottom without sealing of the outer layer plies facing one another.

28 Claims, 7 Drawing Figures

U.S. Patent  Nov. 9, 1982  Sheet 1 of 2  4,358,466
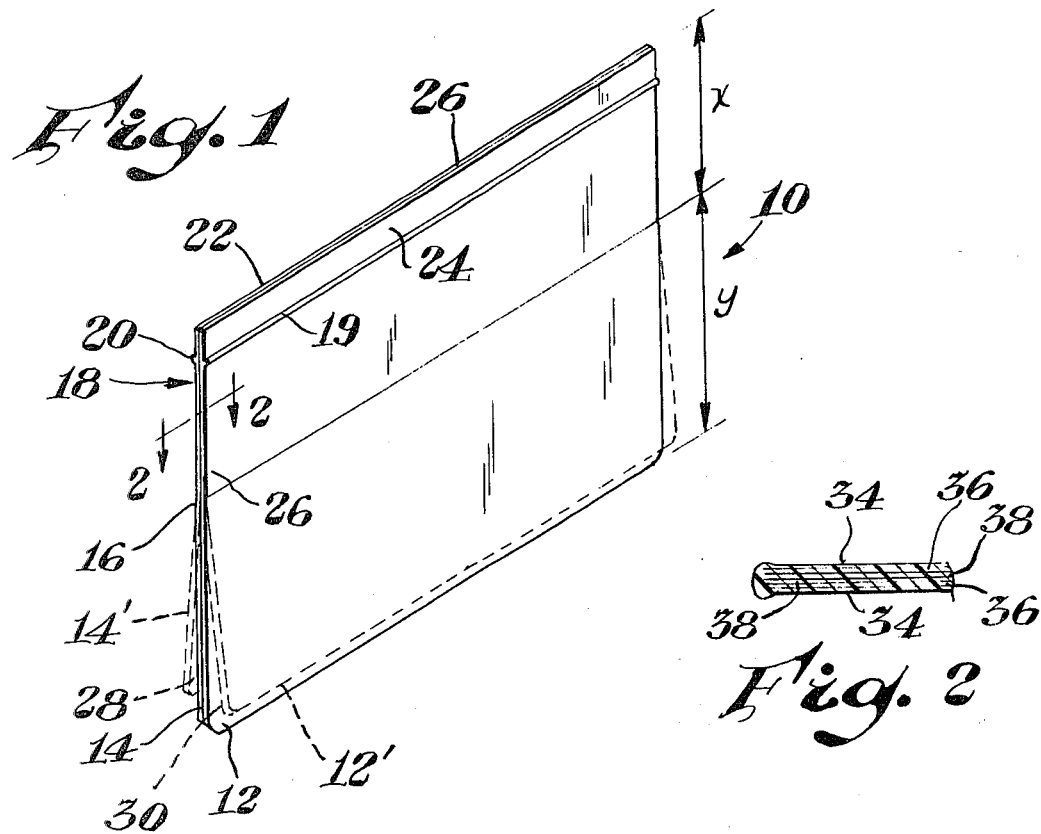
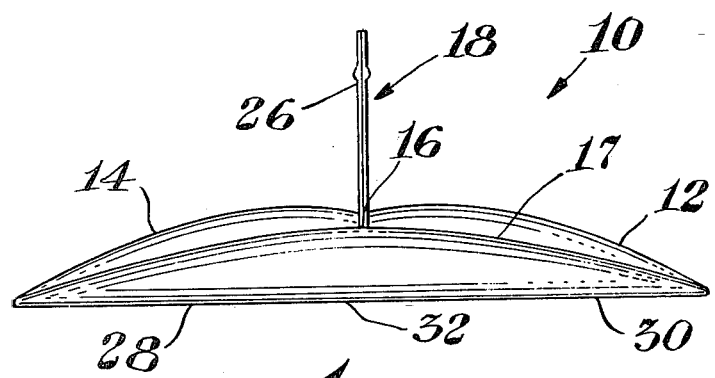
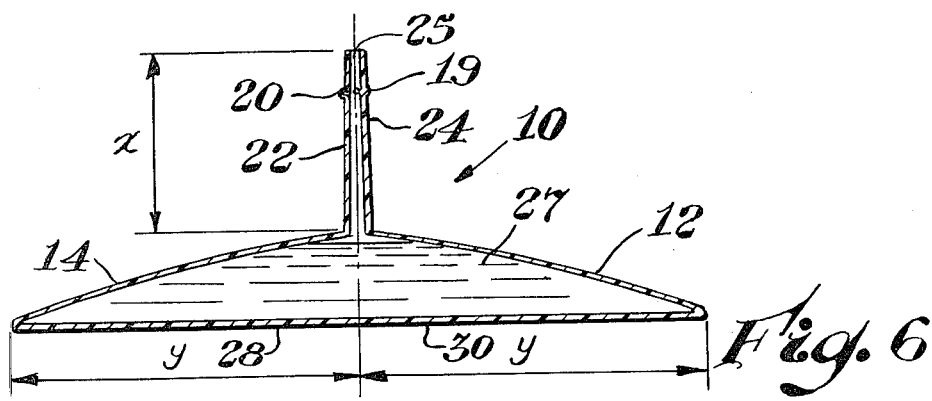

FREEZER TO MICROWAVE OVEN BAG

CROSS-REFERENCE TO RELATED APPLICATION

This application is a continuation-in-part of application Ser. No. 139,363, filed Apr. 11, 1980, now abandoned.

BACKGROUND OF THE INVENTION

With the advent of microwave ovens and the frequent cooking in such ovens of foods taken directly from a freezer, it is desirable to have a thermoplastic container which can be compactly stored in the freezer but which can also be used directly in a microwave oven. Rigid containers which stand upright are not always of the most compact shape for storage in the freezer, often taken up unnecessary room when not fully filled, and customarily require lid removal to allow venting during cooking. Thermoplastic storage and cooking bags which can be laid on their sides have the disadvantage that when opened for venting during cooking, spillage of product in the oven can result.

Since the introduction of microwave cooking, it has been desirable to have a compact plastic pouch which can stand upright sufficiently to avoid spillage, yet remain flexible enough so that the storage space beyond that of the product contained therein is essentially not required to be utilized in the freezer compartment. Gussetted bags are customarily laid on their sides when the product therein is being cooked, as illustrated in FIG. 4 of U.S. Pat. No. 3,851,574, for example. Compact freezing bags with a top opening are illustrated by U.S. Pat. No. 3,389,783, for example, but these have not been designed for venting or microwave cooking and are merely a flat, pillow-type package. Stand-up bags, such as typically illustrated in U.S. Pat. No. 3,799,914 or 3,380,646, are designed to contain food in their upright sections, which make the bags more readily upsettable if they were to be used in a microwave oven for cooking. Other packages designed to give wider bottoms for packaging, such as shown in U.S. Pat. No. 3,003,681, still are intended to contain the bulk of the product in the upright portion of the container, which does not make for most efficient stacking or cooking. The above containers have advantageous features which represent the state of the art prior to the present invention but which fail to include the improvements necessary to have a superior freezer to microwave oven bag which is compactable, yet non-spillable in a cooking environment.

SUMMARY OF THE INVENTION

The present invention comprehends a flexible, thermoplastic bag or container which is principally comprised of two wing-shaped pouch portions with an upstanding neck portion (or filling spout) located thereabove. The wing-shaped pouch portions are the product containment sections of the bag. The neck portion, in addition to being usable for filling and emptying the container, provides an exhaust opening to allow the venting of gas and steam from the container during cooking. Various closures may be utilized to close the fill spout such as an integral, reclosable, zipper-type fastener element.

The bag can be single-layered or multilayered. If formed of multilayered material, the inside and outside skins should be of thermoplastic materials having different melt temperatures with the inner layers having a lower melt temperature. By forming the bag with a gusset and sealing at the lower melt temperature range, wings are formed because the outer skin layers of the gusset do not seal to one another.

When a reclosable, zipper-type fastener or other closure means is contained in the neck portion of the bag, the closure may be designed to be sensitive to increases in vapor pressure within the bag so that the engaging elements of the fastener can automatically open to vent the package upon build-up of pressure during cooking. If the package is not opened prior to cooking, this automatic-venting feature acts as a safety precaution against the bursting of the package due to increases in vapor pressure during cooking.

The engaging elements of the zipper-type fastener can be integrated into the neck portion of the bag by forming them from the inner layers of the thermoplastic material of a multilayer bag or by coextruding a thermoplastic material formed into fastener elements onto the bag material. By forming the engaging elements of the fastener from a thermoplastic material having a softening temperature sensitive to heat normally involved with cooking food products, as may be experienced in microwave cooking, for example, the above-mentioned automatic-venting feature may be enhanced. Upon softening during cooking, the engaging elements of the fastener become more flexible, but do not melt, thereby aiding in the automatic opening of the package upon pressure build-up within the package.

By having the wings comprise the substantial pouch part of the bag, their lay-flat characteristics permit ready stacking of the containers in a freezer compartment with the unfilled spout portion being laid over on one of the wings during storage. The bags can then be transferred directly from the freezer to a microwave oven for cooking, the spout being erected so that the cooking is without spillage.

BRIEF DESCRIPTION OF THE DRAWINGS

FIG. 1 is an isometric view of a bag constructed according to the principals of the present invention, with wing sections of the bag shown in the process of being opened in dotted lines in preparation for receiving product to be contained therein;

FIG. 2 is a fragmentary enlarged cross-sectional view of the multilayered structure of the bag taken along Reference Line 2—2 of FIG. 1;

FIG. 3 is an end view of the bag of FIG. 1 showing pillow-shaped wing sections containing a product therein and the upright spout portion which is used for filling the container and venting the container during cooking;

FIG. 6 is a cross-sectional view of the filled bag taken along Reference Line 6—6 of FIG. 4.

DETAILED DESCRIPTION OF THE PREFERRED EMBODIMENTS

Figure 4:
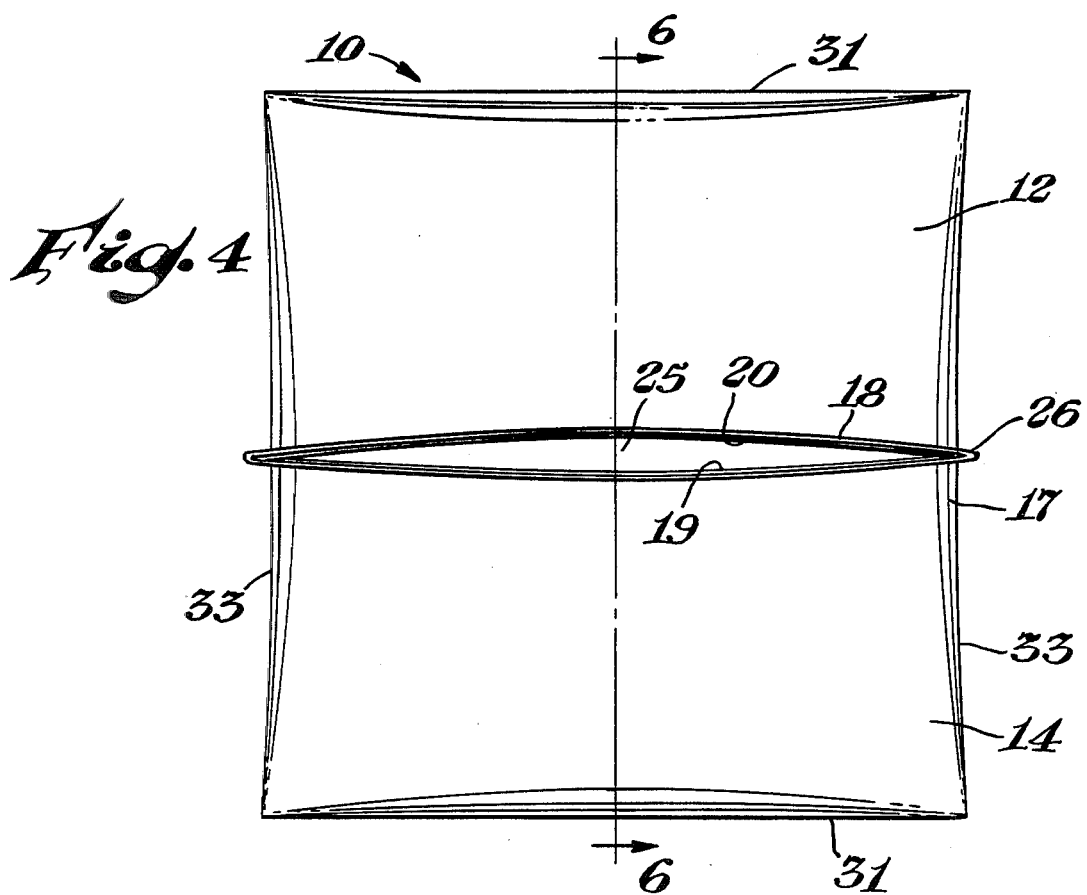
FIG. 4 is a plan view of the filled bag of FIG. 3 with the spout being opened.

Containers for food products are commonly flat bags which lay on their sides, stand-up bags which are subject to tipping over, or rigid containers which lack flexibility and take up excess room. By this invention, a bag has been provided which stands up without tipping, stacks when filled, compactly stores when empty and has a neck which serves as a handle as well as a filling and venting spout when required to serve such functions. The bag of this invention has particular use in freezer storage to microwave cooking applications. In a freezer storage compartment, the neck portion can be folded over for flat stacking and when used for cooking, permits food to be spread out into a thinner, flatter block for more rapid, uniform heating, the neck thereof serving as a splatter shield when the neck portion is opened for venting.

More specifically, there is shown in FIG. 1 a disposable storage and cooking bag 10 preferably formed of a transparent or opaque thermoplastic film material or materials to be later described. Bag 10 comprises wing sections or pouches 12 and 14 shown closed in solid lines and starting to be opened as 12' and 14' in dotted lines in FIG. 1. Extending upwardly from the juncture point 16 of the wings 12 and 14 is a neck or spout section 18. Sides 22 and 24 are separable along a parting line 26 except at their extremities where they are sealed to close the side of the spout 18.

In the embodiment illustrated, spout section 18 contains a closure means comprised of male and female elements 19 and 20, respectively, such as that shown in U.S. Pat. No. 3,198,228, for example. The dimensions and/or shapes of the fastener elements 19 and 20 determine the magnitude of resistance offered against their separation by pressure exerted from within the bag. Accordingly, it is preferred, but not essential to the invention, that fastener elements 19 and 20 be designed such that when the vapor pressure within the bag increases due to cooking food 27 contained therein, the fastener opens to permit venting of vapors through channel 25 as shown in FIG. 6. This automatic-venting feature acts as a safety precaution against the bursting of the bag due to pressure build-up during cooking. If the fastener elements 19 and 20 are not designed to separate during cooking, the fastener should be opened prior to cooking. The designing of appropriate fastener elements is well known in the art and disclosed, for example, in U.S. Pat. No. 3,338,285.

Various methods may be employed to incorporate the fastening means in the spout section 18. For example, the engaging elements 19 and 20 can be formed from the thermoplastic material of sides 22 and 24. If the material of sides 22 and 24 is multilayered, elements 19 and 20 are formed from the inner layers. In FIG. 2, the plies of the multilayered bag material are depicted in cross-section as they face one another in the spout section 18 (which contains the fastening means); outer skin layers 34 are held to inner skin layers 38 by glue layers 36, with the inner skin layer 38 of each side 22 and 24 facing each other. Elements 19 and 20 are formed from the inner skin layers 38.

Preferably, inner skin layer 38, from which fastening elements 19 and 20 are formed, is formed of a thermoplastic material that is heat softenable at temperatures common to the cooking of food 27 (FIG. 6) contained in the bag 10. For example, inner layer 38 can be formed of a high or low density polyethylene resin having a melt temperature of about 107° to 137° C. Of course, the thermoplastic material must be non-meltable at such cooking temperatures when food is to be cooked in the bag. When the fastening elements 19 and 20 are formed from material that is heat softenable at cooking temperatures, the automatic-venting feature described above can be enhanced. As the thermoplastic material softens at cooking temperatures, the fastener elements become more flexible and thereby more easily open to vent the bag upon pressure build-up within the bag.

A second exemplary method of incorporating elements 19 and 20 in the spout section 18 is coextruding a thermoplastic material forming the fastener elements onto the thermoplastic material forming sides 22 and 24. Again, it is preferred that the fastener elements 19 and 20 be formed from thermoplastic material that is heat softenable at cooking temperatures so as to aid in the opening of the closure to permit automatic venting of the bag 10. For example, the fastener elements 19 and 20 can be formed from a low density polyethylene resin having a melt temperature of about 107° C. to 137° C. that is coextruded onto a high density polyethylene material that forms the sole or inner layer of sides 22 and 24.

FIG. 3 shows the end of bag 10 when filled illustrating the slight end bulge 17 which is lower than wing pouches 12 and 14 because the ends are confined by the seal at joint 16.

FIG. 4 is a top view of the bag 10 illustrating that the bag is basically square, such as 8 inches by 8 inches on its sides 31 and ends 33 for a typical example. The spout 18 is open exposing filling and venting channel 25.

Figure 5:
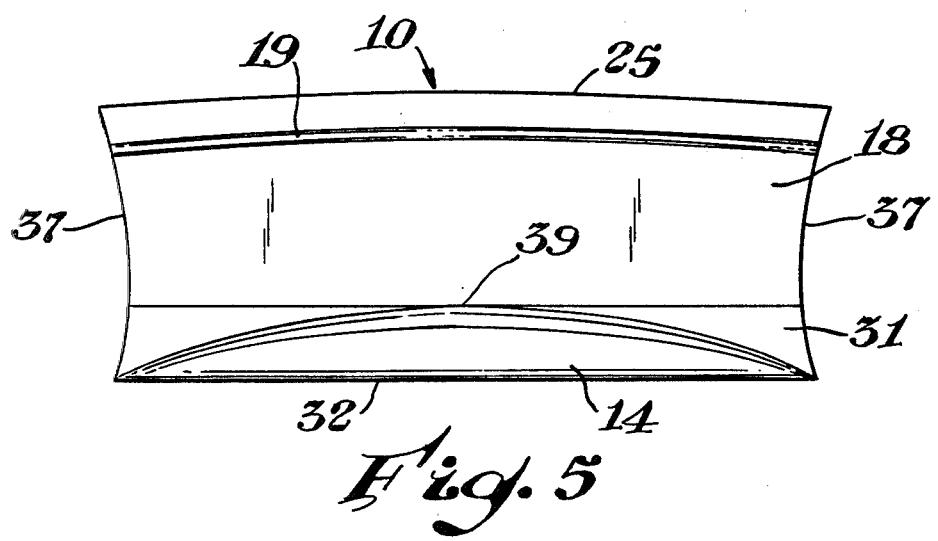
FIG. 5 is a side view of the filled bag of FIG. 3 with the spout being opened.

FIG. 5 is a view looking at side 31 of bag 10 illustrating that as the wing pouches are filled the spout 18 tips at its ends 37. If the neck is of insufficient height, that is, only slightly above, at or below the crest 39 of the wing pouch 14 when filled, leakage or splatter from channel 25 of spout 18 would occur. Likewise, if too tall, spout 18 may fall due to its own weight and would take too much material. It has been found that for an 8 inch by 8 inch bag with closure means contained in the spout, as viewed in FIG. 4, a spout height of from 1 inch to 3 inches is practical and about 2 inches is preferred. By having a practical height for spout 18, the need for placing the bag in a dish to avoid spillage, as with prior art bags, is obviated.

In its filled form, food or other product 27 contained in the bag 10 occupies a pouch area located in each of the wing sections 12 and 14, as illustrated in FIG. 6. When the bag 10 is fully opened out, as illustrated in FIG. 3, the wing sections 12 and 14 lay longitudinally on a flat surface. They are formed by the surfaces 28 and 30 joining together to form a bottom 32 for the bag which is adaptable for laying on any flat surface. The surfaces 28 and 30 were not stuck together during the subsequent edge sealing operation because either the surfaces themselves were separated by a thermal insulating insert, when the sealing of the bag edges occurred, or the surfaces were formed of materials which did not seal at the temperatures at which the rest of the bag seals.

For example, the cross-section of FIG. 2 shows that the plies of each of the wing sections 12 and 14 are formed of an outer skin layer 34, a glue layer 36 and an inner skin layer 38 which face one another in the spout portion 18. The inner layer 38 can be formed, for example, of a low melt temperature olefinic, polymeric material while the outer skins 34 can be formed of a polyester or a nylon-type polyamide thermoplastic material having melt temperatures substantially in excess of that of the inner layer materials. The inner layer 38, if formed of a low or high density polyethylene resin, would have a melt temperature of about 107° C. to 137° C., respectively. High density polyethylene (about 0.95 gms/cm$^3$ and above) is advantageous, as generally its melt temperature is above the boiling point of water and will not become tacky during cooking. However, low density polyethylene (about 0.89 to 0.93 gms/cm$^3$) and polypropylene can also be employed. The outer layer 34, if formed of a typical nylon, such as Nylon 6 resin of Allied Chemical Company, would have a melt temperature of about 215° C. or of a typical polyester, such as polyethylene terephthalate, of about 250° C. The glue layer 36 can be an ionomer copolymer such as a duPont Surlyn resin, or Chemplex Plexar modified polyolefin, or an ethylene-acrylic acid copolymer. The inner layers 38 could be 1.5 mils thick, the outer layers 34, 0.4 mils thick and the glue layer 36, 0.3 mils thick, if desired. As a further example, for bags having a wall thickness from about 1½ to 4 mils, suitable for most applications, the inner layer could comprise 50–80% of the total thickness, the glue layer 10–20%, and the outer layer 10–40%, if desired. Typical values are 68%, 14% and 18%, respectively. The multilayered film can be coextruded by a process such as taught in U.S. Pat. Nos. 3,354,506 or 3,557,265, for example.

The preferred process for forming the bag 10 is to form it from thermoplastic film material having an inner layer 38 and an outer layer 34 with inner layer 38 having a significantly lower heat-softening temperature than outer layer 34. Two plies of the thermoplastic material are layed against one another so that the inner layer 38 abuts against itself to form opposite sides. Surfaces 28 and 30, which are part of outer layers 34, are joined together to form a bottom 32 for the bag. The bottom 32 is then gussetted so that surfaces 28 and 30 face one another. Heat is applied along the opposite margins of the sides of the bag by a hot bar or other sealing element at a temperature above the softening temperature of inner layer 38 but below that of the outer layer 34. At this temperature, sealing of the inner layers 38 occurs while surfaces 28 and 30, being part of outer layers 34, fail to seal or join together. Thus, a bag 10 having wing-shaped pouches 12 and 14 is formed by the gussetted section with the non-gussetted section forming a central neck portion 18 for the bag that is in open communication with the pouches 12 and 14.

Wing or pouch sections 12 and 14 can contain food 27 therein. Upon disengaging fastener elements 19 and 20, the spout 18 can be opened by separating sides 22 and 24 to form a feed channel 25 for introducing the food 27 into each of the wing pouches 12 and 14. A sufficient quantity of food is introduced so as to fill the pouches 12 and 14 without any significant amount of food being contained in the spout or neck portion 18.

Figure 7:
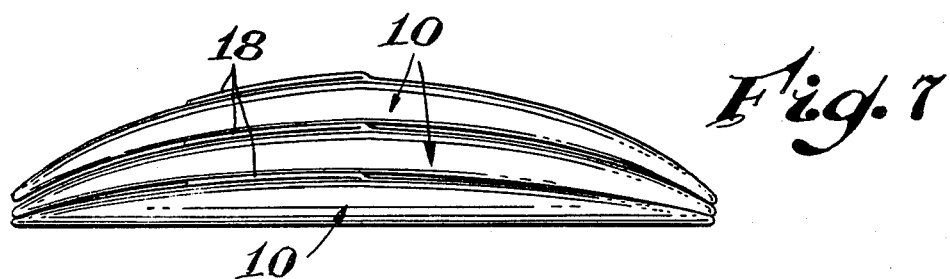
FIG. 7 is an end view of a stack of filled bags of FIG. 3 only with their spout portions bent over as they might be arranged in a freezer.

The spout 18 is shown laying over in FIG. 7. This permits easy stacking of the filled containers 10 when it is desired to freeze the contents 27 with the plurality of other like containers 10 and store them until ready for cooking, such as illustrated in FIG. 7. Here, because the spout can fold over, one bag is permitted to lay directly on another; wing sections of one bag resting on wing sections of the next lower.

Preferably, it has been found that when the neck portion of the bag contains a closure means, the width of each wing section 12 or 14 should be more than half the total height of the bag when in a disposition as shown in full lines in FIG. 1. In one typical embodiment, distance Y, the width of surface 28 or surface 30 of wing sections 12 or 14 would be about 4 to 5 inches long, while the height X of the spout or neck portion would be about 2 inches as shown in FIGS. 1 and 6. With such an arrangement, the bulk of the container is formed of the wing sections, the neck or filling spout 18 being a minor portion of the bag. The bag does not therefore become a stand-up bag. It is more like a lay-flat bag, but one which is not spillable because of the upstanding neck portion, and due to the fact that there is not substantial food intended to be contained in the neck portion.

In other embodiments of the invention, various closures (not illustrated herein) are utilized to close the filling spout of the bag. When the spout is not secured too tightly by a closure, venting of gas and steam from within the bag is provided while the substantial closing of the spout aids in keeping the spout erect to prevent spillage of the product from within the package.

Applicable closures (in addition to the integral zipper-type fastener described above and depicted in the drawings) include, but are not limited to, plastic clips such as those disclosed in U.S. Pat. Nos. 3,370,396; 3,334,805 and 2,981,990; omega shaped plastic fasteners such as those disclosed in U.S. Pat. No. 3,535,746; plastic tie straps such as those disclosed in U.S. Pat. Nos. 3,633,247; 3,874,034; 3,972,469 and 3,973,610; detachable tie straps such as those disclosed in U.S. Pat. Nos. 3,779,139; 3,865,303; 3,052,399 and 3,974,960; and closures using the dead fold characteristics of metal (e.g., twist-ties) such as those disclosed in U.S. Pat. Nos. 3,417,863; 3,481,461 and 3,565,738. Rubber bands, string, adhesive tape and adhesives are further examples of closure means that may be employed to close the filling spout of the bag.

When a closure is to be adjacent to the bag during microwave use, the closure should be microwave compatible. That is, it should be non-metallic and non-meltable under typical microwave cooking conditions. Metallic and other non-microwave compatible closures can be used with bags adopted for cooking in other than microwave ovens, such as boil-in-bag pouches, or with bags adopted merely for product containment and storage.

If the closure is not integral to the neck portion of the bag, the height of the neck portion should be sufficient to allow for ease of handling in opening and closing the exhaust opening to empty, fill or provide venting of the package. A neck height of at least about 4 inches in practical and about 6 inches is preferred. A neck portion of any less height will not tie or close adequately and any more height is unnecessary and may result in the neck portion falling due to its own weight. Closing the neck portion as close to the two wing-shaped pouch portions as possible provides the neck with the best upright stability when tie strap and similar type closures are utilized.

In still other embodiments of the invention, there may be provided no reclosable closure means. For example, a portion of the closed neck portion of the bag may be torn or cut away as a means of providing an exhaust opening to allow venting of vapors during cooking. Bags adopted for non-cooking uses may be provided with no closure means whatsoever.

While certain representative embodiments and details have been shown for purposes of illustrating the invention, it will be apparent to those skilled in the art that various changes and applications can be made therein without departing from the spirit and scope of the invention. For example, various ply combinations, materials and material thicknesses may be interchanged depending on the desired results.

What is claimed is:

1. A process for forming a bag having a neck portion and adjacent opposed wing pouches, said neck portion being a minor portion of the bag, the process comprising the steps of providing thermoplastic film material for the bag having inner and outer skins of different heat-softening temperature responses, selecting the inner skin so as to have a significantly lower heat-softening temperature than said outer skin, laying over two plies of said film against one another so that inner skin abuts against itself and forms opposite sides and a bottom, gussetting the bottom of said film to the extent that the gussetted bottom forms the major portion of the bag, applying heat along opposite margins of said sides of a temperature above the softening temperature of said inner skin but below that of the outer skin, whereby sealing of the inner skin along said margins occurs without sealing of adjoining outer skin along the gussetted bottom of the bag, forming wing pouches from the gussetted bottom immediately adjacent and below the neck portion with the opposed wing pouches being joined at their margins only at their juncture with the base of the neck portion such that the bottom of the bag formed by the opposed wing pouches sets essentially flat when used, and the non-gussetted section forming a central neck portion in open communication with said wing pouches.

2. The process of claim 1 wherein said gussetting of the bottom of said film to form said major portion of the bag is more than one-half the height of said sides so that the gussetted section forms relatively long wing-shaped pouches and the non-gussetted section forms a relatively short central neck portion, said neck section extending essentially across the width of the pouches to provide a wide mouth opening.

3. A flexible thermoplastic film bag having opposed base wing sections and a central neck portion extending upwardly from between the base wing sections, said neck portion having an internal channel in open communication with said wing sections and providing access to said wing sections when the bag is opened, said wing sections being pillow-shaped and of a size to permit substantially all the product for which the bag is designed to hold to be contained therein, said neck portion being of a length sufficient for filling, folding and use without spilling but yet being a minor portion of the bag and free to be folded to permit compact stacking while maintaining a spill free, lay-flat bag configuration when in use.

4. The bag of claim 3 wherein a closure is provided adjacent or in said neck portion.

5. The bag of claim 4 wherein said closure is microwave compatible.

6. The bag of claim 5 wherein said closure is a plastic tie strap.

7. The bag of claim 4 wherein the height of said neck portion is sufficient to allow ease of handling in closing and opening said neck portion.

8. The bag of claim 7 wherein the height of said neck portion is between 4 and 6 inches.

9. The bag of claim 3 wherein the height of said neck portion is less than one-half the width of one of said wing sections.

10. The bag of claim 3 wherein the bag walls are formed of an inner skin and an outer skin having different heat-softening temperature responses, said outer skin having a significantly higher heat-softening temperature so that application of heat at about the lower temperature seals contacting inner skin edges without sealing the outer skin layers.

11. A food package comprising the bag of claim 3, food contained substantially entirely in the wing sections of the bag, said food being spread laterally so as to permit even microwave cooking, the only exit for said food being through said neck portions, whereby spilling of said food contents is avoided during cooking of the same even though the closure is opened for venting.

12. The bag of claim 3 wherein the width of the wing sections forms substantially the width of the bag, said internal channel providing a wide mouth opening extending essentially across the width of said bag.

13. The bag of claim 3 wherein edges of said bag are formed by the margins of said base wing sections and neck portion, said margins being sealed to close the side edges of the bag.

14. The bag of claim 13 wherein means is included for closing said channel, said neck capable of being upstanding for filling or use.

15. The bag of claim 14 wherein the means for closing automatically opens to permit venting when the vapor pressure within the bag increases due to being in a cooking environment.

16. The bag of claim 15 wherein the material forming the closing means become less rigid at cooking temperatures to aid in said opening to permit venting when in a cooking environment.

17. The bag of claim 14 wherein said minor portion of the bag is located below said closing means.

18. The bag of claim 17 wherein the side edges are sealed at and below said closing means.

19. The bag of claim 13 wherein the side edges are sealed closed essentially along their entire length.

20. The bag of claim 13 wherein the wing sections are formed from gussets along the base of said bag, said gussets extending more than one-half the length of the side edges of the bag, the film beyond the gussets forming said neck portion.

21. A flexible container of thermoplastic film, said film comprised of an inner layer and an outer layer, said film folded upon itself and gussetted at its bottom so that surfaces of the inner layer face one another, the gussetted bottom comprising the major portion of the bag, the facing surfaces of the inner layer at the margins of the film sealed together to close the sides of the container, said gussetted bottom forming adjacent wing pouches, said film above said gussetted bottom comprising a minor portion of said container and forming a central neck having a channel permitting access into said wing pouches, said neck being of sufficient height for filling, folding and using while maintaining a spill-free, lay-flat bag configuration.

22. The container of claim 21 wherein the outer layers remains unsealed to itself where surfaces thereof face one another when the gussetted bottom is unopened, said channel extending across the width of said wing pouches.

23. The container of claim 21 wherein the ratio of the minor portion to the major portion of the container is in a range from about 1:7 to about 3:5.

24. The container of claim 23 wherein the ratio is about 1:4.

25. The container of claim 21 wherein the minor portion of the container has a height of at least one inch.

26. The container of claim 25 wherein the minor portion of the container has a height of about two inches.

27. The container of claim 25 or 26 wherein each of the wing pouches of the container have a width of about 4 or more inches.

28. The container of claim 21 wherein a closure is provided adjacent or in said neck.

* * * * *